United States Patent
Izawa

(10) Patent No.: US 12,552,338 B2
(45) Date of Patent: Feb. 17, 2026

(54) VEHICLE POWER SUPPLY SYSTEM

(71) Applicant: Yazaki Corporation, Tokyo (JP)

(72) Inventor: Takaaki Izawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 19/033,559

(22) Filed: Jan. 22, 2025

(65) Prior Publication Data

US 2025/0162527 A1 May 22, 2025

Related U.S. Application Data

(63) Continuation of application No. PCT/JP2023/039595, filed on Nov. 2, 2023.

(30) Foreign Application Priority Data

Dec. 8, 2022 (JP) .................................. 2022-196150

(51) Int. Cl.
*B60R 16/033* (2006.01)
*B60L 1/02* (2006.01)
*B60L 3/00* (2019.01)
*B60L 58/20* (2019.01)

(52) U.S. Cl.
CPC ............ *B60R 16/033* (2013.01); *B60L 1/02* (2013.01); *B60L 3/0046* (2013.01); *B60L 58/20* (2019.02)

(58) Field of Classification Search
CPC ......... B60R 16/033; B60R 16/03; B60L 1/02; B60L 3/0046; B60L 58/20; H02J 7/00
See application file for complete search history.

(56) References Cited

U.S. PATENT DOCUMENTS

| | | | | |
|---|---|---|---|---|
| 2018/0354436 A1* | 12/2018 | Sato | ....................... | H02H 7/268 |
| 2021/0066956 A1* | 3/2021 | Izawa | ................... | H02J 7/0063 |
| 2022/0166249 A1* | 5/2022 | Shindo | ................ | B60W 50/023 |
| 2023/0411981 A1* | 12/2023 | Takahashi | ............... | H02J 7/007 |

FOREIGN PATENT DOCUMENTS

| | | |
|---|---|---|
| JP | 2018-194477 A | 12/2018 |
| JP | 2021-035208 A | 3/2021 |

* cited by examiner

*Primary Examiner* — Lincoln D Donovan
*Assistant Examiner* — Alex W Lam
(74) *Attorney, Agent, or Firm* — Sughrue Mion, PLLC

(57) ABSTRACT

In a vehicle power supply system, a backup power supply device includes a backup 12 V LI battery and a control ECU. Here, a load unit, a load unit, and a load unit are load units having a specific function related to a vehicle. In this case, the load unit is a load unit having another function in addition to the specific function, and has a discharging function of discharging power when estimating the battery state of the backup 12 V LI battery as the another function. The control ECU is switchable among a normal mode, an abnormal mode, and a battery state estimation mode.

4 Claims, 7 Drawing Sheets

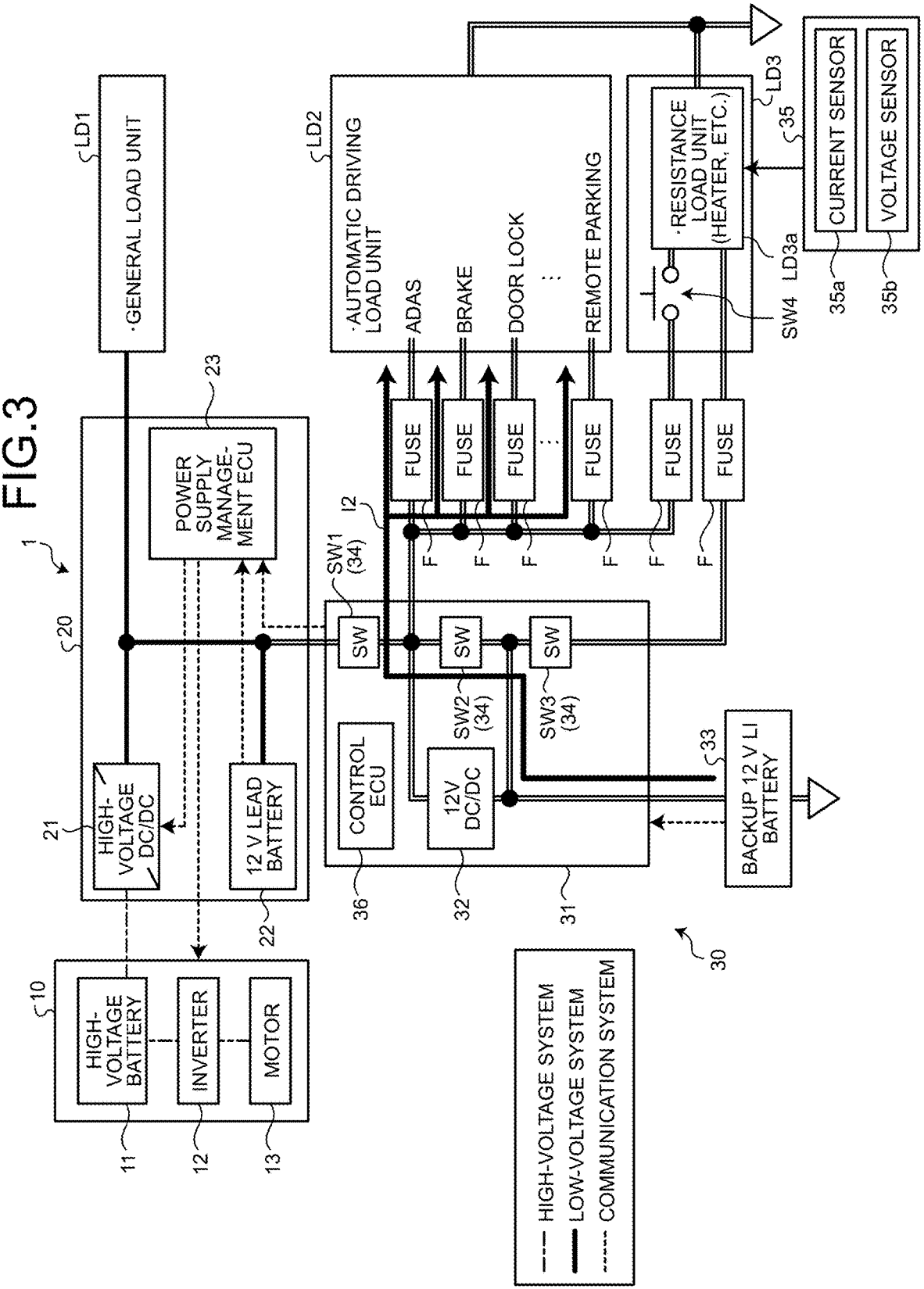

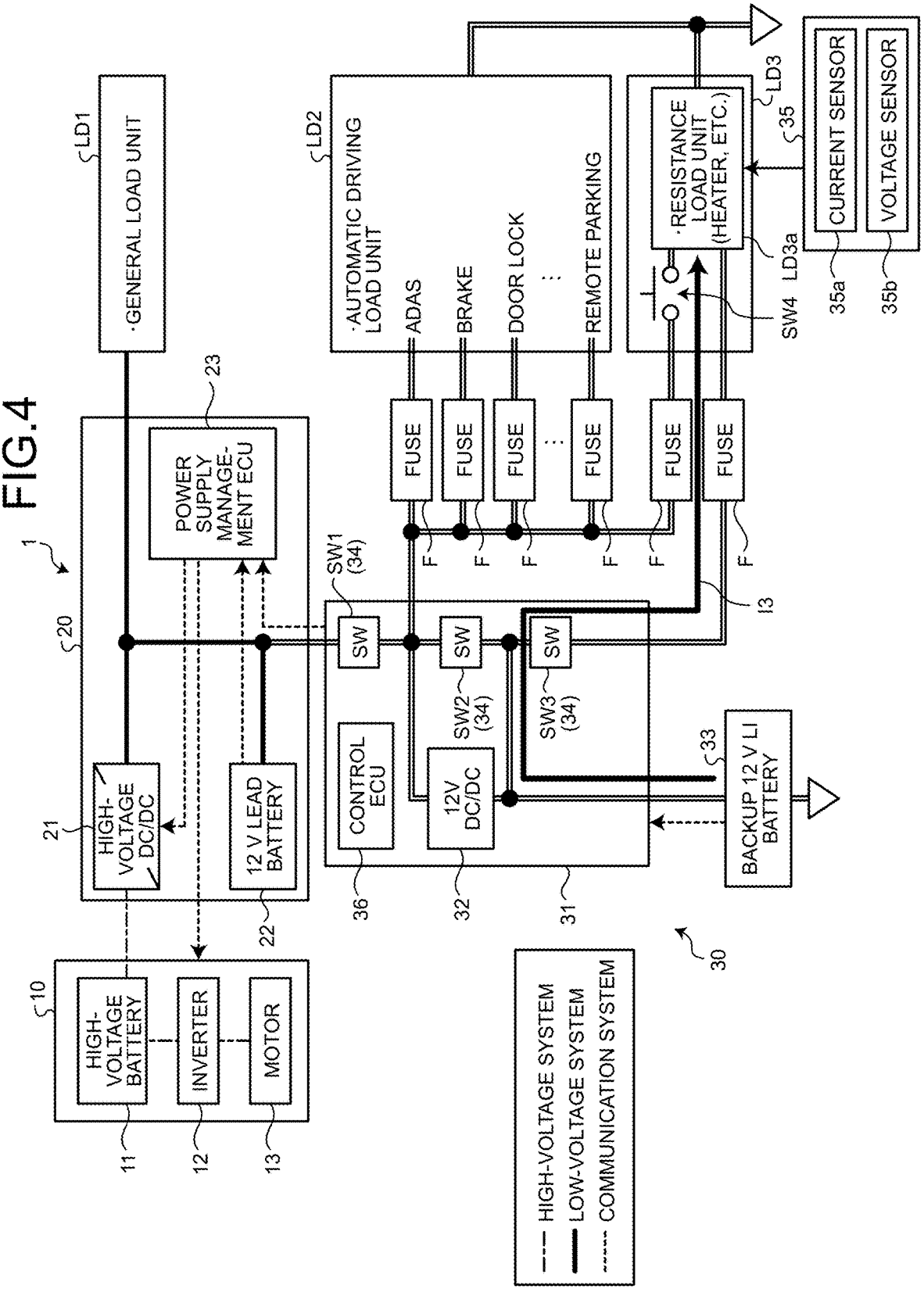

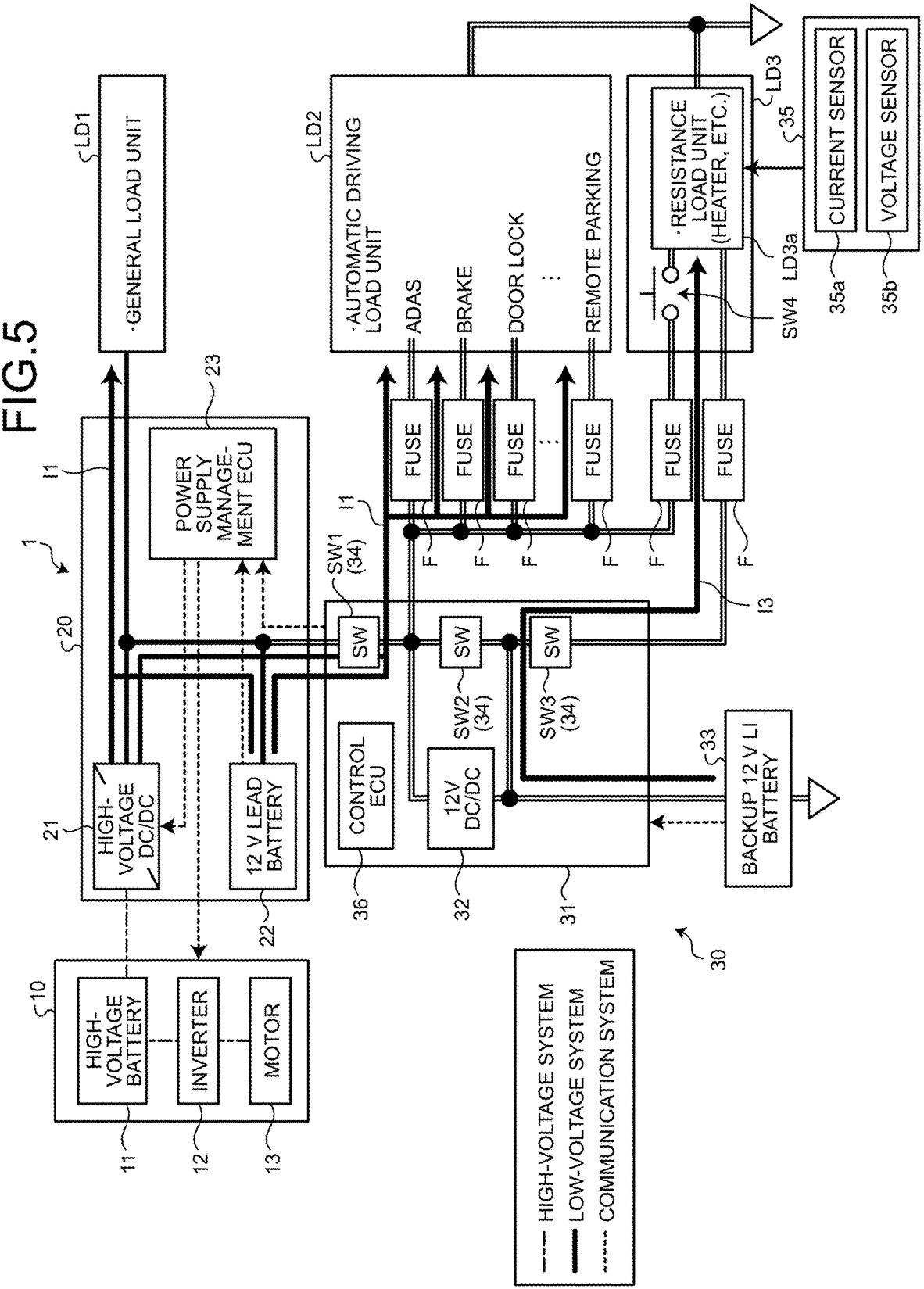

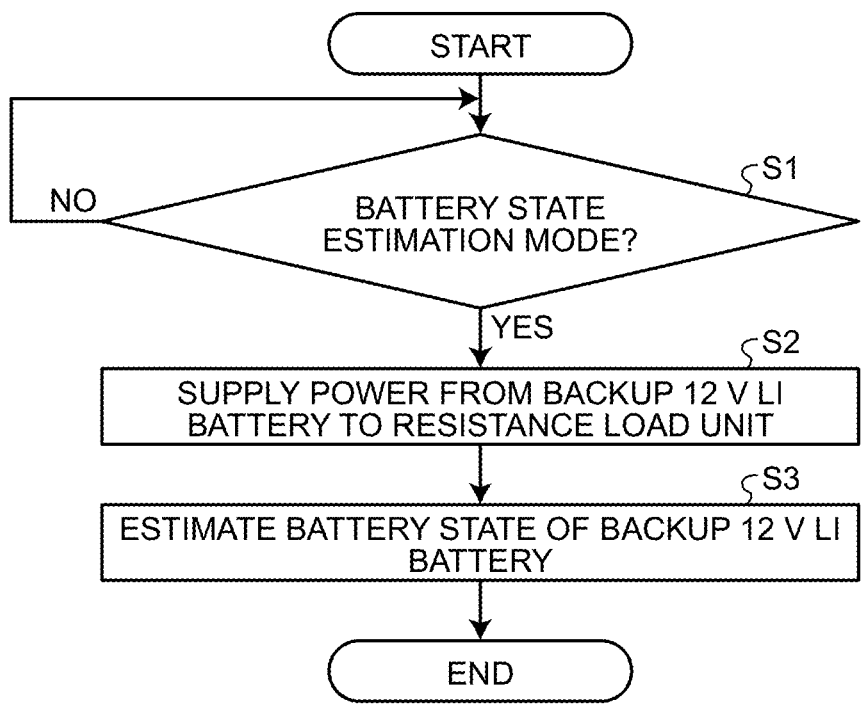

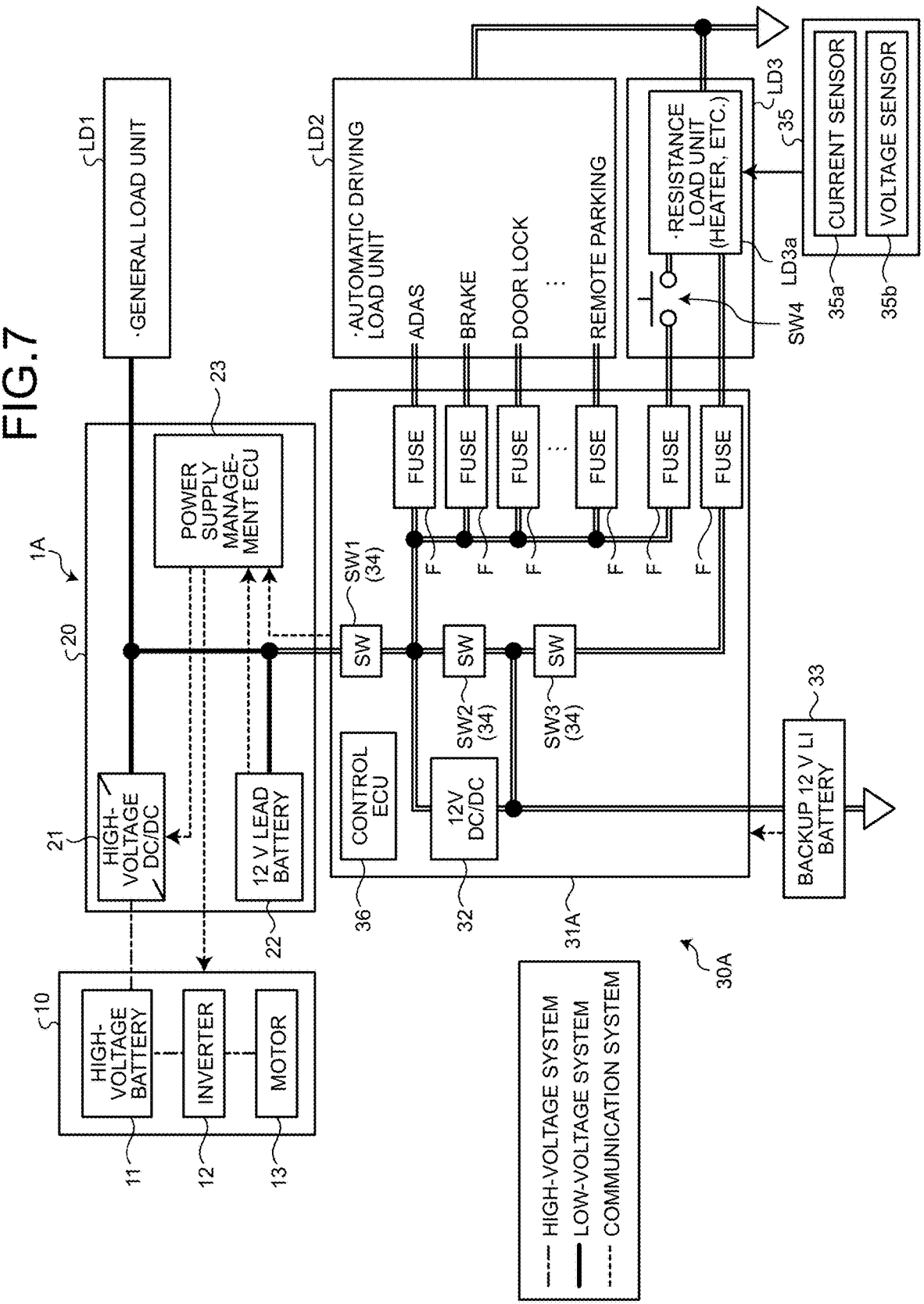

VEHICLE POWER SUPPLY SYSTEM

CROSS-REFERENCE TO RELATED APPLICATION

This application is a continuation application of International Application No. PCT/JP2023/039595 filed on Nov. 2, 2023 which claims the benefit of priority from Japanese Patent Application No. 2022-196150 filed on Dec. 8, 2022 and designating the U.S., the entire contents of which are incorporated herein by reference.

BACKGROUND OF THE INVENTION

1. Field of the Invention

The present invention relates to a vehicle power supply system.

2. Description of the Related Art

Conventionally, as a vehicle power supply system, for example, Japanese Patent Application Laid-open No. JP 2021-035 208 A describes a vehicle power supply system including a main power supply device that is mounted on a vehicle and supplies power to a first load unit and a second load unit, and a backup power supply device that is mounted on the vehicle and supplies power to the second load unit when the main power supply device is abnormal. When the main power supply device is normal, this vehicle power supply system supplies power from the main power supply device to the first load unit and the second load unit, and enables the vehicle to travel in a normal mode, which is a normal driving state. Furthermore, when the main power supply device is abnormal, the vehicle power supply system supplies power to the second load unit from the backup battery but does not supply power to the first load unit from the backup battery, and enables the vehicle to be travelable in an abnormal mode in which the function is limited as compared with the normal mode. The vehicle power supply system having the normal mode and the abnormal mode discharges the power of the backup battery by a discharge circuit to estimate the battery state of the backup battery.

Incidentally, the vehicle power supply system described in Japanese Patent Application Laid-open No. JP 2021-035 208 A described above is desired to suppress an increase in the number of components.

SUMMARY OF THE INVENTION

Therefore, the present invention has been made in view of the above, and an object thereof is to provide a vehicle power supply system capable of suppressing an increase in the number of components.

In order to achieve the above mentioned object, a vehicle power supply system according to one aspect of the present invention includes: a main power supply device that is mounted on a vehicle and supplies power to a first load unit, a second load unit, and a third load unit; and a backup power supply device that is mounted on the vehicle and supplies power to at least the second load unit when the main power supply device is abnormal; wherein the backup power supply device includes a backup battery that stores power supplied from the main power supply device and supplies power to at least the second load unit, and a control unit that controls the power supplied from the main power supply device and the backup battery; the first load unit, the second load unit, and the third load unit are load units having a specific function related to the vehicle; the third load unit is a load unit having another function in addition to the specific function, and has, as the another function, a discharging function of discharging power when estimating a battery state of the backup battery; and the control unit is configured to switch among: a normal mode in which power is supplied from the main power supply device to at least the first load unit and the second load unit when the main power supply device is normal, an abnormal mode in which power is supplied from the backup battery to at least the second load unit and power is not supplied from the backup battery to the first load unit when the main power supply device is abnormal, and a battery state estimation mode in which power is supplied from the backup battery to the third load unit in a state where power is not supplied from the main power supply device to the third load unit to estimate a battery state of the backup battery.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a block diagram illustrating an abnormal mode of the vehicle power supply system according to the embodiment;

FIG. 4 is a block diagram illustrating a battery state estimation mode (part 1) of the vehicle power supply system according to the embodiment;

FIG. 5 is a block diagram illustrating a battery state estimation mode (part 2) of the vehicle power supply system according to the embodiment;

FIG. 6 is a flowchart illustrating an operation example of the vehicle power supply system according to the embodiment; and FIG. 7 is a block diagram illustrating a configuration example of a vehicle power supply system according to a modified example of the embodiment.

DETAILED DESCRIPTION OF THE PREFERRED EMBODIMENTS

A mode (embodiment) for carrying out the present invention will be described in detail with reference to the drawings. The present invention is not limited by the contents described in the following embodiments. In addition, the constituent elements described below include those that can be easily assumed by those skilled in the art and those that are substantially the same. Furthermore, the configurations described below can be appropriately combined. In addition, various omissions, replacements, or changes in the configuration can be made without departing from the gist of the present invention.

Figure 1:
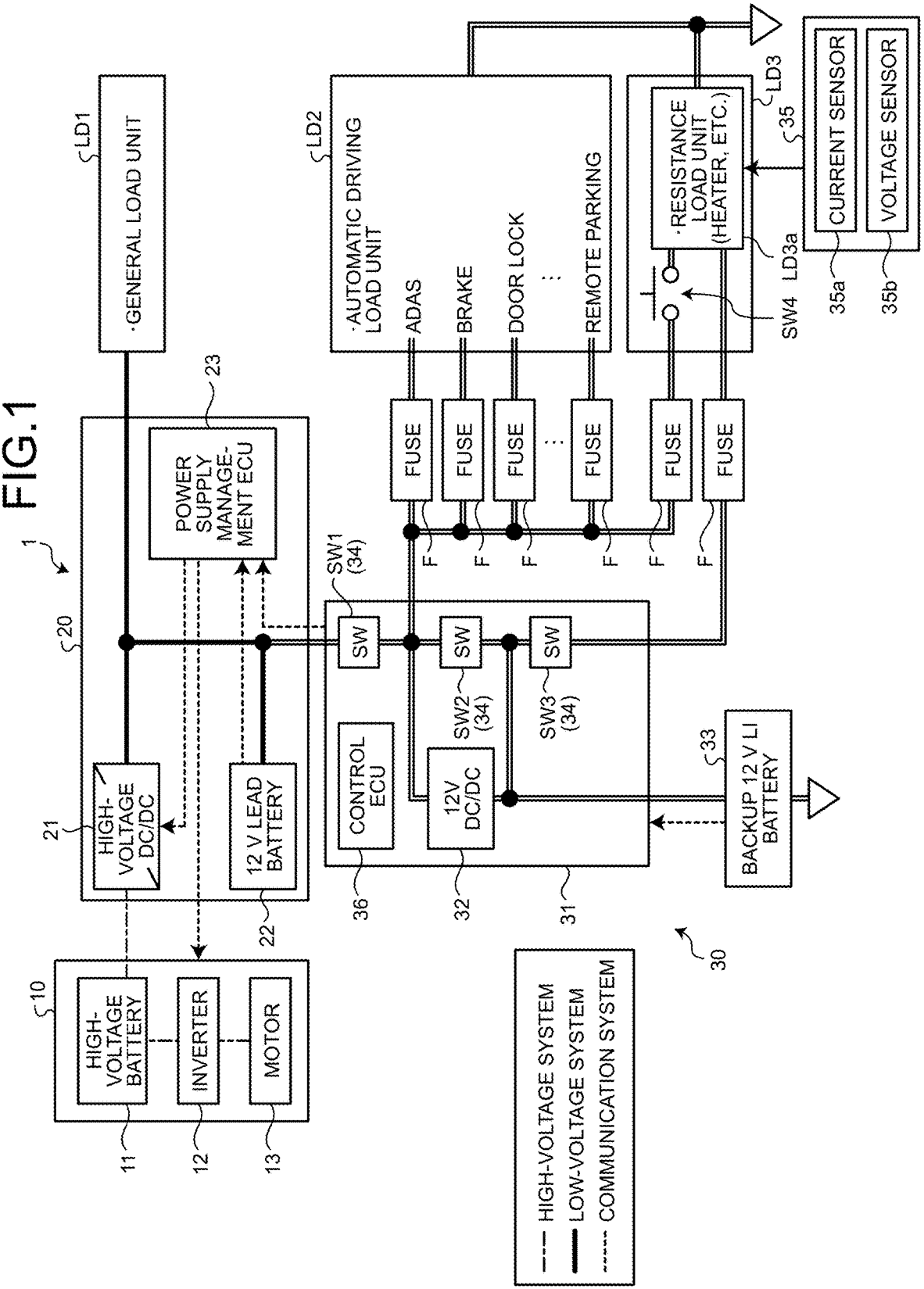
FIG. 1 is a block diagram illustrating a configuration example of a vehicle power supply system according to an embodiment.

A vehicle power supply system 1 according to an embodiment will be described with reference to the drawings. The vehicle power supply system 1 is mounted on a vehicle and supplies power to a load unit of the vehicle. The load unit of the vehicle includes, for example, a load unit LD1 serving as a first load unit, a load unit LD2 serving as a second load unit, and a load unit LD3 serving as a third load unit. The load unit LD1 is equipment for an occupant of the vehicle to spend time comfortably in the vehicle interior, and is configured by, for example, a general load unit such as audio. The load unit LD2 is equipment necessary for automatic driving and the like, and includes, for example, an automatic driving load unit such as advanced driver-assistance systems (ADAS), a brake, a door lock, and a remote parking function. The load unit LD3 is equipment for an occupant of the vehicle to spend time comfortably in the vehicle interior, and is equipment having a relatively large electric resistance, and is configured by, for example, a resistance load unit LD3a such as a heater having a heating function. The load unit LD3 includes a switch circuit SW4 serving as a fourth switch circuit, the switch circuit SW4 being provided between a main power supply device 20 to be described later and the resistance load unit LD3a. The vehicle power supply system 1 appropriately supplies power (also referred to as "DC power".) to the load units LD1 to LD3, and includes a high-voltage power supply system 10, a main power supply device 20, and a backup power supply device 30 as illustrated in FIG. 1.

The high-voltage power supply system 10 constitutes a high-voltage power supply system, and includes a high-voltage battery 11, an inverter 12, and a motor 13. The high-voltage battery 11 supplies the charged power (DC power) to the inverter 12. The inverter 12 is connected to the high-voltage battery 11, converts power (DC power) supplied from the high-voltage battery 11 into AC power, and supplies the converted AC power to the motor 13. The motor 13 is a motor for traveling, and is connected to the inverter 12. The motor 13 is driven by power supplied from the inverter 12 to drive the vehicle.

The main power supply device 20 supplies power to the load unit LD1, the load unit LD2, and the load unit LD3. The main power supply device 20 includes a high-voltage DC/DC converter 21, a 12 V lead battery 22, and a power supply management ECU 23.

The high-voltage DC/DC converter 21 transforms a DC voltage. The high-voltage DC/DC converter 21 steps down the voltage of the DC power output from the high-voltage battery 11, and steps down the voltage to, for example, 12 V in this place. The high-voltage DC/DC converter 21 is connected to the 12 V lead battery 22, and charges the stepped-down DC power to the 12 V lead battery 22. In addition, the high-voltage DC/DC converter 21 is connected to the load unit LD1 and is connected to the load units LD2 and LD3 via the backup power supply device 30. The high-voltage DC/DC converter 21 supplies power having a voltage of 12 V to the load unit LD1, and supplies power having a voltage of 12 V to the load units LD2 and LD3 via the backup power supply device 30.

The 12 V lead battery 22 stores power, and is, for example, a lead storage battery. The 12 V lead battery 22 is connected to the high-voltage DC/DC converter 21 and stores the DC power stepped down by the high-voltage DC/DC converter 21. The 12 V lead battery 22 is connected to the load unit LD1 and is connected to the load units LD2 and LD3 via the backup power supply device 30. The 12 V lead battery 22 supplies power to the load unit LD1 and supplies power to the load units LD2 and LD3 via the backup power supply device 30.

The power supply management ECU 23 controls the high-voltage power supply system 10 and the high-voltage DC/DC converter 21. The power supply management ECU 23 is configured to include an electronic circuit having, as a main body, a well-known microcomputer including a CPU, a storage unit, and an interface. The power supply management ECU 23 controls the high-voltage power supply system 10 based on a control program stored in the storage unit. The power supply management ECU 23 monitors the power storage state of the 12 V lead battery 22, and controls high-voltage DC/DC converter 21 according to the power storage state of the 12 V lead battery 22. For example, when the power storage rate of the 12 V lead battery 22 is less than a predetermined reference value, the power supply management ECU 23 increases the output voltage of the high-voltage DC/DC converter 21 to charge the 12 V lead battery 22. On the other hand, when the power storage rate of the 12 V lead battery 22 is greater than or equal to the reference value, the power supply management ECU 23 lowers the output voltage of the high-voltage DC/DC converter 21 to maintain the power storage rate of the 12 V lead battery 22.

The backup power supply device 30 supplies power to the load unit LD2 instead of the main power supply device 20 when the main power supply device 20 is abnormal such as a ground fault. The backup power supply device 30 is, for example, connected to the main power supply device 20 and the load units LD2 and LD3 via a connector (not illustrated). The backup power supply device 30 is connected to the load units LD2 and LD3 via the fuse F. The backup power supply device 30 includes a housing 31, a 12 V DC/DC converter 32, a backup 12 V LI battery 33 serving as a backup battery, a switch unit 34, a detection unit 35, and a control ECU 36 serving as a control unit.

The housing 31 accommodates various electronic components. The housing 31 is formed in a box shape having a heat dissipation function. The housing 31 is configured separately from the main power supply device 20. The housing 31 accommodates the 12 V DC/DC converter 32, the switch unit 34, and the control ECU 36 in its internal space portion. Note that although the backup 12 V LI battery 33 is externally attached, the housing 31 may accommodate the backup 12 V LI battery 33 in the internal space portion.

The 12 V DC/DC converter 32 transforms a DC voltage. The 12 V DC/DC converter 32 is connected to the high-voltage DC/DC converter 21 via the switch unit 34 (switch circuit SW1). When the backup 12 V LI battery 33 needs to be charged, the 12 V DC/DC converter 32 receives the DC power transformed from a high voltage to a low voltage by the high-voltage DC/DC converter 21 and output, and boosts the voltage to greater than or equal to a terminal voltage of the backup 12 V LI battery 33. The 12 V DC/DC converter 32 is connected to the backup 12 V LI battery 33, and charges the boosted DC power to the backup 12 V LI battery 33.

The backup 12 V LI battery 33 stores power, and is, for example, a lithium ion battery. The backup 12 V LI battery 33 is connected to the 12 V DC/DC converter 32 and stores the DC power boosted by the 12 V DC/DC converter 32. The backup 12 V LI battery 33 is connected to the load unit LD2 and the load unit LD3 via the switch unit 34 (switch circuit SW2), and supplies the stored DC power to the load unit LD2 and the load unit LD3. Furthermore, the backup 12 V LI battery 33 is connected to the load unit LD3 via the switch unit 34 (switch circuit SW3), and supplies the stored DC power to the load unit LD3. The load unit LD3 has a path connected to the switch circuit SW2 via the switch circuit SW3.

The switch unit 34 conducts or cuts off a current. The switch unit 34 is configured to include a switch circuit SW1 serving as a first switch circuit, a switch circuit SW2 serving as a second switch circuit, and a switch circuit SW3 serving as a third switch circuit.

A switch circuit SW1 is provided between the main power supply device 20 and the backup power supply device 30, and switches connection between the main power supply device 20 and the backup power supply device 30. The switch circuit SW1 is located, for example, between the high-voltage DC/DC converter 21 and the 12 V DC/DC converter 32, and switches connection between the high-voltage DC/DC converter 21 and the 12 V DC/DC converter 32. The switch circuit SW1 is turned ON to energize the current path connecting the high-voltage DC/DC converter 21 and the 12 V DC/DC converter 32, and is turned OFF to cut off the current path connecting the high-voltage DC/DC converter 21 and the 12 V DC/DC converter 32. The switch circuit SW1 is located between the high-voltage DC/DC converter 21 and the load units LD2 and LD3, and switches connection between the high-voltage DC/DC converter 21 and the load units LD2 and LD3. The switch circuit SW1 is turned ON to energize the current path connecting the high-voltage DC/DC converter 21 and the load units LD2 and LD3, and is turned OFF to cut off the current path connecting the high-voltage DC/DC converter 21 and the load units LD2 and LD3. Furthermore, the switch circuit SW1 is located between the 12 V lead battery 22 and the load units LD2, LD3, and switches connection between the 12 V lead battery 22 and the load units LD2, LD3. The switch circuit SW1 is turned ON to energize the current path connecting the 12 V lead battery 22 and the load units LD2 and LD3, and is turned OFF to cut off the current path connecting the 12 V lead battery 22 and the load units LD2 and LD3.

For example, when the main power supply device 20 and the backup power supply device 30 are normal, the switch circuit SW1 is turned ON based on an ON signal output from the control ECU 36, and energizes the current path connecting the main power supply device 20 and the backup power supply device 30. On the other hand, when the main power supply device 20 or the backup power supply device 30 is abnormal, although not illustrated, the switch circuit SW1 can be turned OFF upon receiving an output of a circuit that detects abnormality and turned OFF based on an OFF signal output from the control ECU 36, and cuts off a current path connecting the main power supply device 20 and the backup power supply device 30.

A switch circuit SW2 is provided between the backup 12 V LI battery 33 and the load unit LD2 and the load unit LD3, and switches the connection between the backup 12 V LI battery 33 and the load unit LD2 and the load unit LD3. The switch circuit SW2 is turned ON to energize the current path connecting the backup 12 V LI battery 33 and the load unit LD2 and the load unit LD3, and is turned OFF to cut off the current path connecting the backup 12 V LI battery 33 and the load unit LD2 and the load unit LD3.

For example, when the main power supply device 20 and the backup power supply device 30 are normal, the switch circuit SW2 is turned OFF based on an OFF signal output from the control ECU 36, and cuts off the current path connecting the backup 12 V LI battery 33 and the load unit LD2 and the load unit LD3. On the other hand, when the main power supply device 20 is abnormal, although not illustrated, the switch circuit SW2 can be turned ON upon reception of an output of a circuit that detects abnormality and can be turned ON based on an ON signal output from the control ECU 36, and energizes a current path connecting the backup 12 V LI battery 33 and the load unit LD2 and the load unit LD3.

A switch circuit SW3 is provided between the backup 12 V LI battery 33 and the load unit LD3, and switches the connection between the backup 12 V LI battery 33 and the load unit LD3. The switch circuit SW3 is turned ON to energize the current path connecting the backup 12 V LI battery 33 and the load unit LD3, and is turned OFF to cut off the current path connecting the backup 12 V LI battery 33 and the load unit LD3.

For example, when estimating the battery state of the backup 12 V LI battery 33, the switch circuit SW3 is turned ON based on an ON signal output from the control ECU 36, and energizes a current path connecting the backup 12 V LI battery 33 and the load unit LD3. On the other hand, when the battery state of the backup 12 V LI battery 33 is not estimated, the switch circuit SW3 is turned OFF based on the OFF signal output from the control ECU 36, and cuts off the current path connecting the backup 12 V LI battery 33 and the load unit LD3.

The detection unit 35 detects a current and a voltage, and includes a current sensor 35a and a voltage sensor 35b. The current sensor 35a detects a current flowing through the resistance load unit LD3a of the load unit LD3. The current sensor 35a outputs the detected current value to the control ECU 36. The voltage sensor 35b detects a voltage applied to the resistance load unit LD3a of the load unit LD3. The voltage sensor 35b outputs the detected voltage value to the control ECU 36.

The control ECU 36 controls the 12 V DC/DC converter 32 and the switch unit 34. The control ECU 36 is configured to include an electronic circuit having, as a main body, a well-known microcomputer including a CPU, a storage unit, and an interface. The control ECU 36 monitors, for example, the power storage state of the backup 12 V LI battery 33 based on the control program stored in the storage unit, and controls the 12 V DC/DC converter 32 according to the power storage state of the backup 12 V LI battery 33. For example, when the power storage rate of the backup 12 V LI battery 33 is less than a predetermined reference value, the control ECU 36 increases the output voltage of the 12 V DC/DC converter 32 to charge the backup 12 V LI battery 33. On the other hand, when the power storage rate of the backup 12 V LI battery 33 is greater than or equal to the reference value, the control ECU 36 stops the output voltage of the 12 V DC/DC converter 32 and maintains the power storage rate of the backup 12 V LI battery 33.

Figure 2:
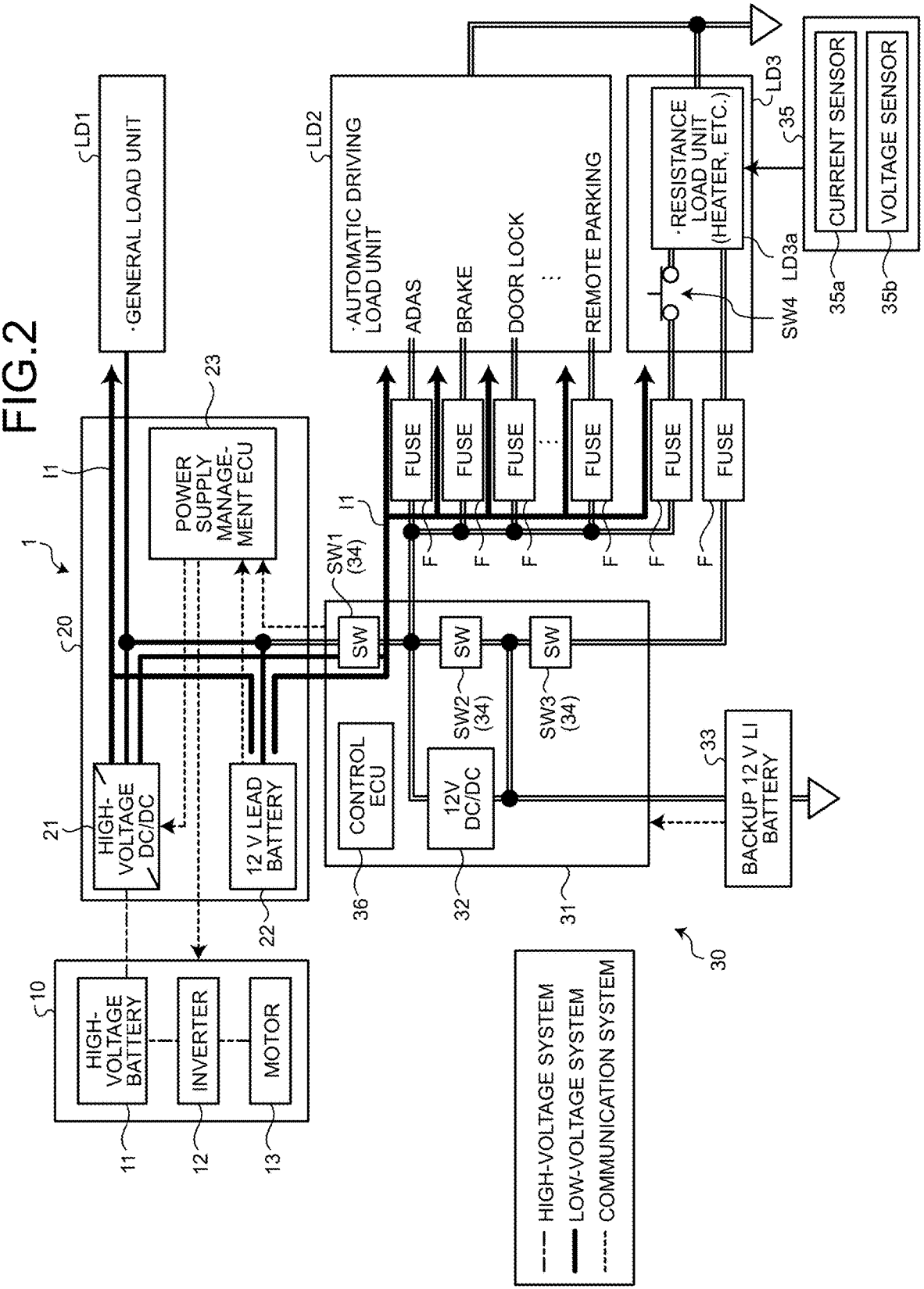
FIG. 2 is a block diagram illustrating a normal mode of the vehicle power supply system according to the embodiment.

In addition, the control ECU 36 causes the vehicle to travel in the normal mode when the main power supply device 20 and the backup power supply device 30 are normal. Here, the normal mode is a normal driving state, for example, a mode in which both the 12 V lead battery 22 and the backup 12 V LI battery 33 are in a normal state and at least the load unit LD1 and LD2 are operated, and in this example, the load units LD1, LD2, and LD3 are operated. In the normal mode, the control ECU 36 outputs an ON signal to the switch circuit SW1 to energize a current path connecting the main power supply device 20 and the backup power supply device 30, and the switch circuit SW4 is arbitrarily operated by the vehicle system or the driver to output an ON signal or an OFF signal, where when the ON signal is output, the control ECU energizes the current path connecting the main power supply device 20 and the resistance load unit LD3a. Furthermore, in the normal mode, the control ECU 36 outputs the OFF signal to the switch circuit SW2, cuts off the current path connecting the backup 12 V LI battery 33 to the load unit LD2 and the load unit LD3, outputs the OFF signal to the switch circuit SW3, cuts off the current path connecting the backup 12 V LI battery 33 and the load unit LD3, and turns OFF the 12 V DC/DC converter 32. As a result, as illustrated in FIG. 2, the control ECU 36 can cause the load current I1 to flow from the high-voltage DC/DC converter 21 or the 12 V lead battery 22 to the load units LD1, LD2, and LD3. Note that when the OFF signal is output, the switch circuit SW4 cuts off the current path connecting the main power supply device 20 and the resistance load unit LD3a, in which case, the load current I1 flows from the high-voltage DC/DC converter 21 or the 12 V lead battery 22 to the load units LD1 and LD2, and the load current I1 does not flow to the load unit LD3.

On the other hand, the control ECU 36 causes the vehicle to travel in the abnormal mode when the main power supply device 20 is abnormal due to a ground fault or the like. Here, the abnormal mode is a driving state of when an abnormality occurs, and is, for example, a mode in which the main power supply device 20 is in an abnormal state, and the load unit LD2 is operated and the load units LD1 and LD3 are not operated. As described above, the abnormal mode is a mode in which the function of the vehicle is limited more than the normal mode. Even in this abnormal mode, the vehicle can self-travel by automatic driving or the like, and for example, the vehicle can self-travel in the abnormal mode to a place where safety of the vehicle is ensured.

In the abnormal mode, the control ECU 36 outputs an OFF signal to the switch circuit SW1 to cut off a current path connecting the main power supply device 20 and the backup power supply device 30, and outputs an OFF signal to the switch circuit SW3 to cut off a current path connecting the backup 12 V LI battery 33 and the load unit LD3. In the abnormal mode, the control ECU 36 outputs an ON signal to the switch circuit SW2 to energize a current path connecting the backup 12 V LI battery 33 to the load unit LD2 and the load unit LD3. The switch circuit SW4 is arbitrarily operated by a vehicle system or a driver to output an ON signal or an OFF signal, where when the ON signal is output, the load unit LD3 is turned ON, and when the OFF signal is output, the load unit LD3 is turned OFF. However, it is conceivable that the load unit LD3 is preferentially turned OFF at the time of abnormality, and accordingly, as illustrated in FIG. 3, the control ECU 36 can cause the load current I2 to flow from the backup 12 V LI battery 33 to the load unit LD2 in a state where the main power supply device 20 is disconnected from the backup power supply device 30. At this time, the control ECU 36 does not supply power from the backup 12 V LI battery 33 to the load unit LD1, and may supply power or may not supply power to the load unit LD3 in relation to the operation of the vehicle system or the driver.

Here, as described above, the load unit LD1 includes a general load unit such as audio, the load unit LD2 includes an automatic driving load unit such as ADAS, and the load unit LD3 includes a resistance load unit LD3a such as a heater. The load unit LD1, the load unit LD2, and the load unit LD3 are load units having specific functions related to the vehicle. In this case, the load unit LD3 is a load unit having other functions in addition to specific functions, unlike the load units LD1 and LD2. The load unit LD3 has, as another function, a discharging function of discharging power when estimating the battery state of the backup 12 V LI battery 33. Specifically, the load unit LD3 serves as both a resistance load unit LD3a such as a heater as a specific function and a load unit (discharge circuit) that discharges power when estimating a battery state as another function. In other words, the load unit LD3 is not a dedicated load unit that discharges power when estimating the battery state, but has other functions as a load unit in addition to a discharging function of when estimating the battery state.

The control ECU 36 has a battery state estimation mode. The battery state estimation mode is a mode in which power is supplied from the backup 12 V LI battery 33 to the load unit LD3 in a state in which power is not supplied from the main power supply device 20 to the load unit LD3, and the battery state of the backup 12 V LI battery 33 is estimated. The control ECU 36 shifts to a battery state estimation mode in which the battery state of the backup 12 V LI battery 33 is estimated at a predetermined timing. The control ECU 36 shifts to the battery state estimation mode, for example, at a timing the main power supply device 20 is turned OFF when the vehicle is parked or at a timing an accessory (ACC) power supply or an ignition (IG) power supply of the vehicle is turned ON and the main power supply device 20 is turned ON. For example, when shifting to the battery state estimation mode at a timing the main power supply device 20 is turned OFF when the vehicle is parked or the like, as illustrated in FIG. 4, the control ECU 36 outputs an ON signal to the switch circuit SW3 and outputs an OFF signal to the switch circuits SW1 and SW2, and energizes a current path connecting the backup 12 V LI battery 33 and the load unit LD3. At this time, the switch circuit SW4 is turned OFF. As a result, the control ECU 36 can cause the discharge current I3 to flow from the backup 12 V LI battery 33 to the load unit LD3.

Furthermore, when shifting to the battery state estimation mode at a timing an accessory (ACC) power supply or an ignition (IG) power supply of the vehicle is turned ON and the main power supply device 20 is turned ON, as illustrated in FIG. 5, the control ECU 36 outputs an ON signal to the switch circuits SW1 and SW3 and outputs an OFF signal to the switch circuit SW2, and energizes a current path connecting the high-voltage DC/DC converter 21 and the 12 V lead battery 22 and the load units LD1, LD2, and LD3 and energizes a current path connecting the backup 12 V LI battery 33 and the load unit LD3. At this time, SW4 is turned OFF by the vehicle system. As a result, the control ECU 36 can cause the discharge current I3 to flow from the backup 12 V LI battery 33 to the load unit LD3 while causing the load current I1 to flow to the load units LD1 and LD2.

When estimating the deterioration state of the backup 12 V LI battery 33 in the battery state estimation mode, the control ECU 36 obtains the internal resistance of the backup 12 V LI battery 33 based on the current value output from the current sensor 35a and the voltage value output from the voltage sensor 35b. Then, the control ECU 36 estimates the deterioration state of the backup 12 V LI battery 33 based on the obtained internal resistance of the backup 12 V LI battery 33. Here, the deterioration state represents the degree (level) of deterioration of the backup 12 V LI battery 33. The degree (level) of deterioration is estimated according to the internal resistance of the backup 12 V LI battery 33. For example, when the internal resistance of the backup 12 V LI battery 33 is greater than or equal to a predetermined reference resistance, the control ECU 36 estimates as an abnormal state in which the degree of deterioration of the backup 12 V LI battery 33 is high. On the other hand, when the internal resistance of the backup 12 V LI battery 33 is less than the reference resistance, the control ECU 36 estimates as not an abnormal state in which the degree of the backup 12 V LI battery 33 is low.

Next, an operation example of the vehicle power supply system 1 will be described. As illustrated in FIG. 6, the control ECU 36 determines whether or not the battery state estimation mode is established (Step S1). For example, when shifted to the battery state estimation mode at a timing the main power supply device 20 is turned OFF when the vehicle is parked or the like (Step S1; Yes), the control ECU 36 supplies power from the backup 12 V LI battery 33 to the resistance load unit LD3a which is a heater having a heating function (Step S2). For example, as illustrated in FIG. 4, the control ECU 36 outputs an ON signal to the switch circuit SW3 and outputs an OFF signal to the switch circuits SW1 and SW2, energizes a current path connecting the backup 12 V LI battery 33 and the load unit LD3, supplies power from the backup 12 V LI battery 33 to the resistance load unit LD3a, and discharges the backup 12 V LI battery 33 by the resistance of the load unit LD3 which is a heater. At this time, the switch circuit SW4 is turned OFF. In the battery state estimation mode, for example, the backup 12 V LI battery 33 is discharged by the resistance of the load unit LD3 for several seconds to several ten seconds. Next, the control ECU 36 estimates the battery state of the backup 12 V LI battery 33 (Step S3). The control ECU 36 obtains the internal resistance of the backup 12 V LI battery 33 based on, for example, the current value output from the current sensor 35a and the voltage value output from the voltage sensor 35b. Then, the control ECU 36 estimates the battery state of the backup 12 V LI battery 33 based on the obtained internal resistance of the backup 12 V LI battery 33. In Step S1 described above, when not shifted to the battery state estimation mode (Step S1; No), the control ECU 36 determines again whether or not the battery state estimation mode is established.

As described above, the vehicle power supply system 1 according to the embodiment includes the main power supply device 20 and the backup power supply device 30. The main power supply device 20 is mounted on a vehicle and supplies power to the load unit LD1, the load unit LD2, and the load unit LD3. The backup power supply device 30 is mounted on a vehicle, and supplies power to at least the load unit LD2 when the main power supply device 20 is abnormal. The backup power supply device 30 includes a backup 12 V LI battery 33 that stores power supplied from the main power supply device 20 and supplies power to at least the load unit LD2, and a control ECU 36 that controls power supplied from the main power supply device 20 and the backup 12 V LI battery 33. Here, the load unit LD1, the load unit LD2, and the load unit LD3 are load units having specific functions related to the vehicle. In this case, the load unit LD3 is a load unit having other functions in addition to a specific function, and has a discharging function of discharging power when estimating the battery state of the backup 12 V LI battery 33 as another function. The control ECU 36 is switchable among a normal mode, an abnormal mode, and a battery state estimation mode. The normal mode is a mode in which power is supplied from the main power supply device 20 to at least the load unit LD1 and the load unit LD2 when the main power supply device 20 is normal. The abnormal mode is a mode in which power is supplied from the backup 12 V LI battery 33 to at least the load unit LD2 and power is not supplied from the backup 12 V LI battery 33 to the load unit LD1 when the main power supply device 20 is abnormal. The battery state estimation mode is a mode in which power is supplied from the backup 12 V LI battery 33 to the load unit LD3 in a state in which power is not supplied from the main power supply device 20 to the load unit LD3, and the battery state of the backup 12 V LI battery 33 is estimated.

With this configuration, in the vehicle power supply system 1, since the load unit LD3 also serves as a load unit used when estimating the battery state of the backup 12 V LI battery 33, a dedicated load unit (discharge circuit) for estimating the battery state can be reduced. As a result, the vehicle power supply system 1 can suppress an increase in the number of components and an increase in size, thereby reducing the cost. In addition, since the vehicle power supply system 1 does not include the heat dissipation circuit for estimating the battery state in the backup power supply device 30, it is possible to suppress widening of the interval between the components in consideration of heat dissipation, and it is possible to reduce the mounting area more than the area occupied by the single component.

In the vehicle power supply system 1, the backup power supply device 30 includes a switch circuit SW1 that switches the connection with the main power supply device 20, a switch circuit SW2 that switches the connection between the backup 12 V LI battery 33 and the load unit LD2, and a switch circuit SW3 that switches the connection between the backup 12 V LI battery 33 and the load unit LD3. The load unit LD3 includes a switch circuit SW4 that switches connection with the main power supply device 20. When the main power supply device 20 is normal, the control ECU 36 switches to the normal mode by turning ON the switch circuit SW1 and turning OFF the switch circuit SW2 and the switch circuit SW3. At this time, the switch circuit SW4 is arbitrarily controlled by a vehicle system or a driver. When the main power supply device 20 is abnormal, the control ECU 36 switches to the abnormal mode by turning ON the switch circuit SW2 and turning OFF the switch circuit SW1 and the switch circuit SW3. When estimating the battery state of the backup 12 V LI battery 33, the control ECU 36 switches to the battery state estimation mode by turning ON the switch circuit SW3 and turning OFF the switch circuit SW2 in a state where the fourth switch circuit SW4 is turned OFF. As described above, the vehicle power supply system 1 can appropriately switch among the normal mode, the abnormal mode, and the battery state estimation mode by switching each switch circuit.

In the vehicle power supply system 1, the load unit LD3 is a heater having a heating function as a specific function. In the case of the battery state estimation mode, the control ECU 36 discharges the backup 12 V LI battery 33 by the resistance of the load unit LD3 which is a heater. With this configuration, the vehicle power supply system 1 can use a heater having a relatively large electrical resistance as a discharge circuit when estimating the battery state, so that the power of the backup 12 V LI battery 33 can be sufficiently discharged, and the internal resistance of the backup 12 V LI battery 33 can be appropriately obtained.

Note that in the above description, the backup power supply device 30 includes the switch circuit SW1, the switch circuit SW2, and the switch circuit SW3, and the load unit LD3 includes the switch circuit SW4, and each mode is switched by switching each switch circuit, but the configuration of the switch circuit for switching to each mode is not limited to the above, and may be other configurations of the switch circuit. For example, although the switch circuit SW4 is a switch that can be operated by a vehicle system or a user such as a driver, the switch circuit SW4 may control the switch to be automatically turned OFF when performing the battery state estimation, and may return the switch setting to the state immediately before after the battery state estimation is completed. It is assumed that the switch circuit SW4 is either within or outside the control range of the control ECU 36 of the backup power supply device 30.

Furthermore, the example in which the load unit LD3 is a heater has been described, but this is not the sole case, and may be another load unit.

Furthermore, the housing 31 is formed as a separate body without accommodating a power distribution unit and a fuse F in its internal space portion, but this is not the sole case. For example, in a vehicle power supply system 1A illustrated in FIG. 7, a housing 31A accommodates a power distribution unit and a fuse F in an internal space portion thereof, and the power distribution unit and the fuse F are integrated as a unit. With this configuration, the vehicle power supply system 1A can reduce the size of the components of the connector and the bolt fastening portion, and can suppress an increase in the number of these components. In addition, the vehicle power supply system 1A can also shorten a connection path length of a cable or the like connecting the components.

In addition, the load unit LD1 and the load unit LD2 may be configured to respectively include apparatuses that are combined with each other to constitute one actuator. For example, the load unit LD1 includes a first steering apparatus, and the load unit LD2 includes a second steering apparatus. The load unit LD1 and the load unit LD2 constitute one actuator (steering device) by combining the first steering apparatus and the second steering apparatus. This actuator performs a normal operation by the operation of the apparatus of the load unit LD1 and the apparatus of the load unit LD2 (normal mode). In addition, when the apparatus of the load unit LD1 is not operated and the apparatus of the load unit LD2 is operated, the actuator performs the limiting operation in which the function is limited as compared with the normal operation (abnormal mode). With this configuration, the vehicle power supply system 1 can cause the vehicle to travel to a place where the safety of the vehicle can be ensured even when the main power supply device 20 is abnormal.

Furthermore, description has been made that in the battery state estimation mode, the deterioration state of the backup 12 V LI battery 33 is estimated, but other than the deterioration state may be estimated. For example, in the battery state estimation mode, the charging capacity or the abnormal state may be estimated, or other states related to the battery may be estimated together with the deterioration state.

In a vehicle power supply system according to the present embodiment, since a third load unit also serves as a load unit used for estimating the battery state of the backup battery, a dedicated load unit for estimating the battery state can be reduced, and as a result, an increase in the number of components can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply system comprising:
   a main power supply device that is mounted on a vehicle and supplies power to a first load unit, a second load unit, and a third load unit; and
   a backup power supply device that is mounted on the vehicle and supplies power to at least the second load unit when the main power supply device is abnormal; wherein
   the backup power supply device includes a backup battery that stores power supplied from the main power supply device and supplies power to at least the second load unit, a control unit that controls the power supplied from the main power supply device and the backup battery, a first switch circuit that switches a connection with the main power supply device, a second switch circuit that switches a connection between the backup battery and the second load unit, and a third switch circuit that switches a connection between the backup battery and the third load unit;
   the first load unit, the second load unit, and the third load unit are load units having a specific function related to the vehicle;
   the third load unit is a load unit having another function in addition to the specific function, and has, as the another function, a discharging function of discharging power when estimating a battery state of the backup battery, and includes a fourth switch circuit that switches connection with the main power supply device;
   the control unit is configured to switch among,
      a normal mode in which power is supplied from the main power supply device to at least the first load unit and the second load unit when the main power supply device is normal,
      an abnormal mode in which power is supplied from the backup battery to at least the second load unit and power is not supplied from the backup battery to the first load unit when the main power supply device is abnormal, and
      a battery state estimation mode in which power is supplied from the backup battery to the third load unit in a state where power is not supplied from the main power supply device to the third load unit to estimate a battery state of the backup battery, and
      switches to the normal mode by turning ON the first switch circuit and turning OFF the second switch circuit and the third switch circuit when the main power supply device is normal,
      switches to the abnormal mode by turning ON the second switch circuit and turning OFF the first switch circuit and the third switch circuit when the main power supply device is abnormal, and
      switches to the battery state estimation mode by turning ON the third switch circuit and turning OFF the second switch circuit in a state where the fourth switch circuit is turned OFF when estimating a battery state of the backup battery.

2. The vehicle power supply system according to claim 1, wherein
   the third load unit is a heater having a heating function as the specific function, and
   the control unit discharges the backup battery by a resistance of the third load unit that is the heater in the case of the battery state estimation mode.

3. The vehicle power supply system according to claim 1, wherein
   the control unit, in the case of the battery state estimation mode, supplies power to the third load unit to obtain the internal resistance of the backup battery and estimates the deterioration state of the backup battery based on the internal resistance of the backup battery.

4. The vehicle power supply system according to claim 2, wherein
   the control unit, in the case of the battery state estimation mode, supplies power to the third load unit to obtain the internal resistance of the backup battery and estimates the deterioration state of the backup battery based on the internal resistance of the backup battery.

* * * * *